Patented Oct. 29, 1940

2,219,369

UNITED STATES PATENT OFFICE 2,219,369

CONDENSATION PRODUCTS

Karl Memminger, Magdeburg-Sudost, Germany, assignor to Fahlberg-List Aktiengesellschaft Chemische Fabriken, Magdeburg-Sudost, Germany, a firm of Germany No Drawing. Application January 18, 1939, Serial No. 251,570. In Germany January 18, 1938

3 Claims. (Cl. 260—6)

In the United States Patent 2,130,342, filed May 16, 1936, and patented September 20, 1938, I et al. have described a process for the production of condensation products, in which an alkali metal salt of toluene sulfonamide is treated with a substantial excess of formaldehyde for about 2 hours at about 100° C., preferably in a reflux apparatus. The heated mixture of such process is allowed to separate into two layers and the lower layer comprising the product is recovered.

The condensation products obtained thereby are practically completely soluble in cold dilute caustic soda solution of about 5 per cent. strength and, among other purposes, are well suited for the production of textile assistants, particularly those which can be used for imparting wool-like properties to cellulosic artificial fibres.

I have now found that particularly valuable condensation products of this general type may be obtained, if instead of using only solutions of alkali metal salts of toluene sulfonamide, a homogeneous mixture of alkali metal salts of toluene sulfonamide and protein are treated, similar as in the process of the above mentioned prior patent, with a substantial excess of formaldehyde for a considerable time, e. g., 4 hours, up to a temperature of about 100° C.

The expression "protein" used in the present specification and claims is intended to comprise protein, albumin, protein-like and albuminous substances; casein, gelatine, blood albumin or fish albumin being preferably used.

In accordance with the amount and the quality of the added protein substances, more or less turbid resinous products of yellowish colour are obtained which are soluble in ethyl alcohol, only traces of unsoluble substance remaining; the products are completely soluble in dilute caustic soda solution or dilute caustic potash solution.

Example 1

(All parts indicated hereafter are parts by weight.)

171 parts of para-toluene sulfonamide are dissolved together with 17.1 parts of gelatine in 355 parts of caustic potash solution of 16 per cent. strength at a temperature above room temperature, e. g., of about 60° C. The solution, if necessary, may be freed from impurities by filtration and thereupon is dried by evaporation. 1 part of the residue obtained by evaporation, constituting practically a homogeneous mixture of potash salt of toluene sulfonamide and gelatine, is heated together with about 2 parts of formaldehyde solution of 40 vol. per cent. strength in a reflux apparatus for several hours (for example 4 hours) at about 100° C. After cooling two layers are formed, the lower of which comprising the product and the upper being a liquid. The lower layer is separated from the said liquid, is washed out and dried in a vacuum. Hereby a bright yellow, turbid, tough or viscous resinous condensation product is obtained.

Instead of gelatine as indicated above casein, blood albumin or fish albumin may be used.

Example 2

Similar products are obtained, if instead of the amount indicated in Example 1 17.1 parts of gelatine or the like larger amounts of the protein substance are used. In Example 1 a proportion of protein to toluene sulfonamide of 1:10 has been indicated. Any amount between this proportion and a proportion of 1:2 is suitable for most purposes when treating toluene sulfonamide and protein by a caustic alkali solution. Even amounts below the proportion of 1:10 and upwards of the proportion 1:2 may be useful in certain cases, e. g., proportions of 1:1.

The condensation products obtained according to the invention may be, generally spoken, stated as more or less turbid resinous substances which may be viscous, tough, rigid or even brittle in accordance with the content and the kind of the protein used. All the products are practically soluble in cold diluted solutions of caustic alkali as well as in ethyl alcohol and methyl alcohol.

The condensation products in accordance with my invention may be used, e. g., in connection with the improvement of the qualities of cellulosic materials, as, e. g., artificial threads, filaments or fibres, staple fibres (Zellwolle), goods manufactured therefrom, e. g., yarns, fabrics, webs, fleeces, etc., or as additions in the production of artificial spinning fibres.

What I claim is:

1. A process for the production of condensation products, which comprises dissolving para-toluene sulfonamide and protein in caustic alkali solution at temperatures above room temperature and drying the obtained solution by evaporation, then heating 1 part of the residue obtained by evaporation with about 2 parts by weight of formaldehyde solution of 40 vol. per cent. strength at approximatively 100° C. for several hours, recovering after cooling the resulting reaction product from the remaining liquid, washing and drying it in vacuum.

2. A process for the production of condensation products, which comprises dissolving para-toluene sulfonamide and casein in caustic potash solution at a temperature of about 60° C., removing impurities, if any, by filtration and drying the solution by evaporation, then heating 1 part of the residue obtained by evaporation with about 2 parts by weight of formaldehyde solution of 40 vol. per cent. strength at 100° C. for about 4 hours, allowing the reaction mixture to cool whereby a separation into two layers occurs, separating the lower layer comprising the product, washing and drying it in vacuum.

3. Process according to claim 2 in which the proportion of the protein selected from a group consisting of gelatine, casein, blood albumin, fish albumin to para-toluene sulfonamide is ranging from 1:10 to 1:2.

KARL MEMMINGER.